United States Patent [19]

Morris et al.

[11] 3,976,610

[45] Aug. 24, 1976

[54] ACRYLATE RUBBER VULCANIZABLE COMPOSITIONS

[75] Inventors: Roger E. Morris, Cuyahoga Falls; Harold Tucker, Brecksville, both of Ohio

[73] Assignee: The B. F. Goodrich Company, Akron, Ohio

[22] Filed: Apr. 14, 1975

[21] Appl. No.: 567,938

Related U.S. Application Data

[63] Continuation-in-part of Ser. No. 453,278, March 21, 1974, Pat. No. 3,912,672, which is a continuation of Ser. No. 272,849, July 18, 1972, abandoned.

[52] U.S. Cl. .................. 260/23 TN; 260/74 UA; 260/63 UY; 260/77.5 CR; 526/14; 526/27; 526/49; 526/282; 526/292; 526/296

[51] Int. Cl.² .................. C08F 8/40; C08F 8/42; C08F 220/18; C08F 220/26

[58] Field of Search ............... 260/23 TN, 77.5 CR, 260/80.7, 80.76, 79.7, 80.8, 78.5 R, 78.5 I, 80.73, 63 UY; 450/614, 619.5

[56] References Cited

UNITED STATES PATENTS

| | | | |
|---|---|---|---|
| 3,050,487 | 8/1962 | Solomon | 260/30.6 |
| 3,582,508 | 6/1971 | McIntosh | 260/23.7 |

*Primary Examiner*—Stanford M. Levin
*Attorney, Agent, or Firm*—Alan A. Csontos

[57] ABSTRACT

Acrylate rubbers having both halogen and carboxyl cure sites are vulcanized using an alkali metal salt of a carboxylic or organo-phosphoric acid and an amine-blocked isocyanate. The vulcanized compositions exhibit low press-cured and post-cured compression set.

10 Claims, No Drawings

ACRYLATE RUBBER VULCANIZABLE COMPOSITIONS

CROSS REFERENCE TO RELATED APPLICATIONS

This is a continuation-in-part of application Ser. No. 453,278, now U.S. Pat. No. 3,912,672, filed on Mar. 21, 1974, which is a continuation of application Ser. No. 272,849 filed on July 18, 1972, and now abandoned.

BACKGROUND OF THE INVENTION

Acrylate rubbers exhibit very favorable qualities of weatherability, high temperature serviceability, and good oil resistance. These qualities make the rubbers useful for under-the-hood automotive applications and out-of-door applications. Their use is limited by the tendency of the vulcanizates to post-cure during use. This results in property change and in some cases in failure of the article. To overcome these problems, the acrylate rubber vulcanizates are purposely post-cured, often as long as 24 hours or more, to obtain a more complete cure. This is shown by a reduced compression set. It would be of great advantage to the industry to reduce the time required for, or eliminate the need of, post-cure for the acrylate rubber vulcanizates.

Much effort has gone into the development of both faster and more efficient cures of acrylate rubbers. An article in Rubber Chemistry and Technology, Vol. 44, No. 2 (1971), traces the more recent efforts. Various cure sites and cure systems have been evaluated; see U.S. Pat. Nos. 3,288,763; 3,324,088; 3,337,492; 3,435,010; 3,450,681 and 3,458,461. However, the need for a long post-cure has not been eliminated, and improved vulcanizates are desired.

SUMMARY OF THE INVENTION

Compositions comprising an acrylate rubber having both halogen and carboxyl cure sites and, as the only curatives, (a) an alkali metal salt of a carboxylic or organo-phosphoric acid, and (b) an amine-blocked isocyanate are readily cured to vulcanizates having improved press-cure and post-cure compression set.

DETAILED DESCRIPTION

The acrylate rubbers are interpolymers comprising acrylate monomer(s), a reactive halogen-containing monomer, and a carboxyl-containing monomer.

The acrylate rubber contains from about 40% to about 99.8% by weight, based upon the weight of the polymer, of an acrylate or mixtures of acrylates of the formula

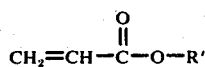

wherein R' is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate, methylthioethyl acrylate, hexylthioethyl acrylate, and the like; and α and β-cyanoethyl acrylate, α, β, and γ-cyanopropyl acrylate, cyanobutyl acrylate, cyanohexyl acrylate, cyanooctyl acrylate, and the like. Often mixtures of two or more types of acrylate monomers are employed.

Preferredly, the rubber contains from about 65% to about 99.6% by weight of an acrylate or mixtures of acrylates, of the formula wherein R' is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like, and methoxyethyl acrylate, ethoxyethyl acrylate, and the like. Both an alkyl acrylate and an alkoxyalkyl acrylate can be used in admixture.

The rubber contains from about 0.1% to about 30% by weight of an active halogen-containing monomer(s). The halogen groups can be chlorine, bromine, or iodine. The monomers are of two main types, halogen-containing vinylidene hydrocarbons and halogen-containing vinyl monomers having the halogen group at least 2 carbon atoms removed from an oxygen atom(s). Examples of halogen-containing vinylidene hydrocarbons are vinyl benzyl chloride, vinyl benzyl bromide, 5-chloromethyl-2-norbornene, 5-bromomethyl-2-norbornene, 5-β-chloroethyl-2-norbornene, and the like. The second type of monomer, i.e., those having the halogen group at least 2 carbon atoms removed from an oxygen atom, are characterized by having ether (-O-), ketone

or ester

structures in the monomer where the halogen group is at least 2 carbon atoms and up to 6 or more carbon atoms removed from an oxygen atom. Examples of these monomers are halogen-containing vinyl esters such as vinyl chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 5-chloroacetoxymethyl-2-norbornene, 5-(α,β-dichloropropionylmethyl)-2-norbornene, and the like.

The more preferred halogen-containing monomers are vinyl benzyl chloride, 5-chloromethyl-2-norbornene, vinyl chloroacetate, 2-chloroethyl acrylate, and 5-(α-chloroacetoxymethyl)-2-norbornene.

More preferredly, the rubber contains from about 0.2% to about 15% by weight of the halogen-containing monomer. At this level, the halogen content is from about 0.1% to about 5% by weight of the rubber. Due to availability and cost, the chlorine-containing monomers are preferred.

The rubbers also contain from about 0.1% to about 20% by weight of a carboxyl-containing monomer(s). The monomer can be monocarboxylic or polycarboxylic, containing from 3 to about 8 carbon atoms. Examples of such monomers are acrylic acid, methacrylic acid, ethacrylic acid, β,β-dimethyl acrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably, the rubber contains from about 0.2% to about 10% by weight of the carboxyl-containing monomer. At this level, the carboxyl content is from about 0.1% to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of non-halogen-containing and non-carboxyl-containing copolymerizable vinylidene monomers having a terminal vinylidene (CH$_2$=C<) group. Examples of such are phenyl acrylate, cyclohexyl acrylate, methacrylates, such as methyl methacrylate, ethyl methacrylate, and the like; vinyl and allyl esters such as vinyl acetate, vinyl propionate, allyl acetate, and the like; vinyl ketones such as methyl vinyl ketone; vinyl and allyl ethers such as vinyl methyl ether, vinyl ethyl ether, allyl methyl ether, and the like; vinyl aromatics such as styrene, α-methyl styrene, vinyl toluene, and the like; vinyl nitriles such as acrylonitrile and methacrylonitrile; vinyl amides such as acrylamide, methacrylamide, N-methyl methacrylamide, and the like; and dienes and divinyls such as butadiene, isoprene, divinyl benzene, divinyl ether, diethylene glycol diacrylate, and the like. The more preferred copolymerizable monomers are vinyl acetate, allyl acetate, methyl methacrylate, ethyl methacrylate, vinyl ethyl ether, styrene, α-methyl styrene, acrylonitrile, methacrylonitrile, acrylamide, methacrylamide, divinyl benzene, and diethylene glycol diacrylate.

The acrylate rubbers can be prepared using emulsion (latex), suspension, solution, and bulk techniques known to those skilled in the art. Because it is desirable to polymerize the monomers to 90 percent conversion or over, emulsion and suspension techniques are usually employed. The polymerization can be performed as a batch reaction, or one or more ingredients can be proportioned during the run. Temperature of polymerization ranges from about −10°C. to about 100°C., whereas a more preferred range is from about 5°C. to about 80°C.

The polymerization can be initiated by free-radical generating agents. Examples of such agents are organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium potassium, and ammonium persulfate, used alone or with redox systems; and the use of ultraviolet light with photo-sensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art.

The polymerization normally is continued until about 90% conversion of monomers is obtained. The resulting latex can be coagulated to isolate the polymer. Typical coagulation procedures are salt/acid coagulations, use of polyvalent metal salts such as MgSO$_4$, use of alcohols such as methanol and isopropyl alcohol, and freeze agglomeration techniques. The rubber is then usually washed with water and dried.

The acrylate rubbers are solid elastomers having a dilute solution viscosity (DSV) of over 0.5 as measured on 0.2 gram of rubber in 100 ml. benzene at 25°C. Raw polymer Mooney values (ML-4 at 212°F.) are from about 20 to about 100.

The rubbers are admixed with cure ingredients and compounding ingredients using two-roll mills, internal mixers such as Banburys and extruders, and like equipment.

The acrylate rubbers can be vulcanized using known curatives. Examples of these curatives are the soap-sulfur systems such as potassium and sodium stearate, sodium acetate, and potassium tartate with sulfur or sulfur donors such as dipentamethylene thiuram hexasulfide; polyamines such as hexamethylene diamine, triethylene diamine, triethylene tetraamine, and the like; and ammonium-carboxylic acid salts such as ammonium benzoate, ammonium adipate, and ammonium stearate, used alone or with alkyl halides such as dodecyl bromide. A disadvantage of these curatives is their failure to develop low compression set after press-cure.

It has been found that the acrylate rubbers of this invention are vulcanized efficiently in the absence of sulfur using an alkali metal salt of a carboxylic or organophosphoric acid and an amine-blocked isocyanate. The press-cured and post-cured essentially sulfur-free vulcanizates exhibit comparatively lower compression set than known vulcanizate compositions. This is achieved at no loss of desirable acrylate properties. Furthermore, the use of the amine-blocked isocyanate in the cure system yields increased scorch safety over the use of an amine alone as a cure catalyst.

The carboxylic acid metal salt is used at a level from about 0.5 part to about 7 parts by weight per 100 parts of rubber, and more preferredly, from about 1 part to about 5 parts by weight. The metal is an alkali metal. The carboxylic acid is preferredly a monocarboxylic acid containing from 2 to about 24 carbon atoms. The acids may be unsaturated, and can contain hydroxy, ether, ester, or ketonic groups. Examples of such acids are acetic acid, propionic acid, isobutyric acid, valeric acid, caproic acid, octanoic acid, 2-ethyl hexanoic acid, decanoic acid, lauric acid, palmitic acid, stearic acid, cyclohexane carboxylic acid, crotonic acid, cinnamic acid, hydroxy acetic acid, acetoacetic acid, butoxy acetic acid, levulinic acid, mono-3-octyl maleate, benzoic acid, phthalic acid, toluic acid, salicylic acid, naphthenic acid, and the like. More preferredly, the carboxylic acid contains from about 6 to about 20 carbon atoms. Examples of the more preferred monocarboxylic acids are octanoic acid, 2-ethyl hexanoic acid, decanoic acid, lauric acid, stearic acid, cinnamic acid, benzoic acid, toluic acid, naphthenic acid, and the like.

Preferredly, the metal salt is a salt of an alkyl or of an aromatic monocarboxylic acid. Potassium and sodium are the preferred alkali metals. Examples of the more preferred carboxylic acid metal salts are sodium octanoate, potassium 2-ethyl hexanoate, sodium t-dodecanoate, sodium and potassium tetradodecanoate, sodium and potassium stearate, sodium and potassium benzoate.

The alkali metal salts of organo-phosphoric acids also may be used at the same levels of use as the metal salts of carboxylic acids. These compounds are characterized by the structure

wherein M is an alkali metal, $y = 1$ or $2$, $z = 1$ or $2$, and $y + z = 3$, and R is an alkyl radical containing 1 to 24 carbon atoms, an aryl radical containing 6 to 24 carbon atoms, or a polyether as the condensation product of an organic acid or alcohol with ethylene oxide. Examples of these compounds are sodium salt of monophenyl phosphate, sodium salt of mono-p-tert-butyl phenyl phosphate, potassium salt of di-o-xenyl phosphate, sodium salt of mono-lauryl phosphate, sodium salt of dioctyl phosphate, potassium salt of distearyl phosphate, potassium salt of monododecyl-monobenzyl phosphate, and sodium and potassium salts of mono- and di-alkylphenoxy poly(ethyleneoxy) ethyl phosphates. More preferredly, M is sodium or potassium and R, when an alkyl radical, contains about 8 to about 18 carbon atoms, and, when an aryl radical, contains 6 to about 14 carbon atoms.

The amine-blocked isocyanates are used as cure catalysts in the compositions. Upon heating to vulcanization temperatures, the amine-blocked isocyanates decompose to yield free amine which catalyzes the cure of the acrylate rubber. The use of amine-blocked isocyanates in place of free amine in the compositions provides for increased scorch safety. The amine-blocked isocyanates are employed in levels from about 0.1 part to about 10 parts by weight per 100 parts by weight of acrylate rubber. More preferredly, they are used in from about 0.3 part to about 5 parts by weight.

Amine-blocked isocyanates are known to the art (see U.S. Pat. Nos. 3,238,010 and 3,300,431). They are prepared by reacting an amine with a mono-, di- or polyisocyanate. Simply contacting the amine and isocyanate, usually in a solvent or diluent, is sufficient to prepare an amine-blocked isocyanate. The reaction can be represented as follows:

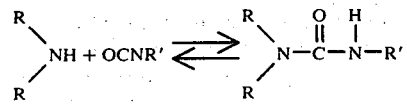

wherein R is a hydrocarbon group and R' is a hydrocarbon group which can contain further isocyanate (-NCO) groups.

The amines used to prepare the amine-blocked isocyanates are strong amines, having a dissociation (-log K) constant of below 10 (see Lange's Handbook of Chemistry, 10th Edition, McGraw-Hill Book Co., N.Y. (1967), page 1213). The amines can be primary or secondary amines or guanidines, but more preferredly are secondary amines or guanidines.

The secondary amines can be aliphatic or aromatic amines, cyclic methyleneamines, or heterocyclic amines. Examples of such amines are dimethylamine, diethylamine, diisopropyl amine, dioctyl amine, dilauryl amine, dibenzyl amine, methylbenzyl amine, methylethanol amine, diethanol amine, imidazole pyrrolidine, piperidine, piperazine, morpholine, and the like. The more preferred secondary amines are the dialkylamines wherein the alkyl group contains 1 to about 6 carbon atoms. Examples of the guanidines are guanidine, tetramethyl guanidine, dibutyl guanidine, diphenyl guanidine, diorthotolyl guanidine, dicyandiamide, and the like.

The isocyanates employed can be mono-, di-, or polyisocyanates. Examples of the isocyanates are hexyl isocyanate, lauryl isocyanate, octadecyl isocyanate, phenyl isocyanate, p-chlorophenyl isocyanate, m,p-dichlorophenyl isocyanate, 2,4- and 2,6-toluene diisocyanate, p-phenylene diisocyanate, bitolyl diisocyanate, diphenylmethane-p,p'-diisocyanate, diphenylmethane triisocyanate, and the like. The more preferred isocyanates are the aromatic isocyanates which include phenyl isocyanates such as phenyl isocyanate, p-chlorophenyl isocyanate, m,p-dichlorophenyl isocyanate, and the like; aromatic diisocyanates such as 2,4- and 2,6-toluene diisocyanate, p-phenylene diisocyanate, and the like; and diphenyl diisocyanates such as diphenylmethane-p,p'-diisocyanate, diphenylpropylidene diisocyanate, di(3-methylphenyl)-p,p'-diisocyanate, and the like.

Examples of amine-blocked isocyanates are dimethylamine/p-chloro- and m,p-dichlorophenyl isocyanate, dioctylamine/octadecyl isocyanate, dibenzylamine/hexyl isocyanate, morpholine/phenyl isocyanate, diphenylguanidine/tolyl isocyanate, dimethylamine/toluene diisocyanate, dicyandiamide/octadecyl isocyanate, diethylamine/toluene diisocyanate, dibutylamine/diphenylmethane diisocyanate, piperidine/bitolyl diisocyanate, pyrrolidine/diphenylmethane-p,p'-diisocyanate, di(tetramethyl guanidine)/toluene diisocyanate, and the like.

The acrylate rubbers can be admixed with many other rubber compounding ingredients. Examples of such ingredients are fillers such as the carbon blacks, calcium sulfates, aluminum silicates, phenol-formaldehyde and polystyrene resins, asbestos, and the like; plasticizers and extenders such as dialkyl and diaryl organic esters like diisobutyl, diisooctyl, and dibenzyl sebacates, azelates, phthalates, and the like, petroleum oils, castor oil, tall oil, glycerin, and the like; antioxidants, and stabilizers such as phenyl-$\beta$-naphthylamine, 2,6-di-t-butyl paracresol, 2,2'-methylenebis-(4-ethyl-6-t-butyl phenol), 2,2'-thiobis-(4-methyl-6-t-butyl phenol), 4,4'-butylidenebis-(6-t-butyl-m-cresol), tris(3,5-di-t-butyl-4-hydroxybenzyl)isocyanurate, tetrakismethylene-3(3',5'-di-t-butyl-4'-hydroxyphenyl)propionate methane, distearyl thiodipropionate, tri(-nonylatedphenyl) phosphite, and the like; and other ingredients such as pigments, tackifiers, flame retardants, fungicides, and the like.

The novel compositions are cured at temperatures from about 250°F. to about 450°F., whereas a more preferred range is from about 275°F. to about 400°F.

Cure time varies inversely as temperature, and ranges from about 1 minute to about 60 minutes or more. The polymers can be post-cured for about 3 to 8 hours at a temperature from about 300°F. to about 375°F.

The novel compositions develop rapid and stable cures. Full property development is achieved faster than with previously known compositions. This is evidenced by the lower compression set values obtained after press-cure and post-cure. The vulcanizates were evaluated as to their plied disk compression set (ASTM D395V), tensile and elongation (ASTM D412), hardness (ASTM D676-Durometer A), and Gehman Freeze (D1053). Cure times were determined following ASTM D1646, using a Mooney Viscometer at 250°F. with a large rotor, or using a Monsanto Rheometer or a B.F.G. Cone Curometer as described in U.S. Pat. No. 3,494,172.

The vulcanizates are useful in many applications where weatherability, high temperature serviceability and oil resistance are required. Such applications are under-the-hood automotive parts such as gaskets, seals, packings, belting and hosing, and out-of-doors applications such as weatherstripping, sealants, and hosing.

The following examples serve to more fully illustrate the invention.

EXAMPLE I

A polymer containing ethyl acrylate, n-butyl acrylate, methacrylic acid, and vinyl benzyl chloride was prepared using standard emulsion polymerization techniques. The recipe used is as follows:

| | |
|---|---|
| Water, grams | 2400 |
| n-Butyl Acrylate, grams | 1420 |
| Ethyl Acrylate, grams | 380 |
| Methacrylic Acid, grams | 5.7 |
| Vinyl Benzyl Chloride, grams | 20 |
| Gafac PE 510[1], grams | 35 |
| Daxad 17[2], grams | 9.5 |
| Sodium Sulfate, grams | 5.7 |
| Diisopropylbenzene Hydroperoxide, milliliters[3] | 2.8 |
| SFS[4], milliliters[5] | 3.6 |
| Sequestrene NaFe[6], milliliters[7] | 2.0 |
| $Na_2S_2O_4$, milliliters[8] | 15 |

1 - alkylphenoxy poly(ethyleneoxy) ethyl phosphate
2 - polymerized alkyl naphthalene sulfonic acid
3 - 1.4 milliliters catalyst in 10 milliliters acetone
4 - sodium formaldehyde sulfoxalate
5 - 5% by weight in water
6 - sodium ferric ethylenediamine tetraacetic acid
7 - 5% by weight in water
8 - 0.2% by weight in water The Gafac PE 510 was mixed in 200 grams of water and adjusted to a pH of 6.5. The ethyl acrylate, n-butyl acrylate, methacrylic acid, and vinyl benzyl chloride were mixed together. 2200 grams of water was charged to a vessel which had been previously evacuated and purged with nitrogen gas. One-half of the Gafac solution was added, followed by 190 grams of the monomer solution, the Daxad 17 and the sodium sulfate. The reactor mix was cooled to 17°C. and the hydroperoxide, SFS, Sequestrene NaFe, and $Na_2S_2O_4$ added to initiate the reaction. Polymerization temperature was maintained at about 20°C. to 25°C. The remaining monomer solution was proportioned into the reactor over a 7-hour period. At 3.5 hours into the run, the remaining one-half of the Gafac solution was added. Total polymerization time was 10 hours. Percent conversion of monomers to polymer was above 95%. The emulsion was coagulated using a 25% by weight solution of NaCl in water, and methanol. The isolated polymer was washed with water and dried. The polymer was a rubber having about a 30 raw polymer Mooney value (M1-4, 212°F.).

The Example demonstrates that the polymers employed in this invention are readily prepared using standard polymerization techniques. The polymers are just as easily prepared using suspension, solution, or bulk polymerization procedures and techniques.

EXAMPLE II

Ethyl acrylate rubbers containing methacrylic acid and vinyl benzyl chloride as cure site monomers were vulcanized using an alkali metal salt of a carboxylic acid and an amine-blocked isocyanate as the cure system. Two soap/sulfur cures of the rubber were run for a comparison. The rubber composition in percent by weight of interpolymerized monomer was:

| | |
|---|---|
| Ethyl Acrylate | 98.0 |
| Vinyl Benzyl Chloride | 1.6 |
| Methacrylic Acid | 0.4 |

The recipes used were as follows (in parts by weight):

| | 1 | 2 | 3 |
|---|---|---|---|
| Rubber | 100 | 100 | 100 |
| N550 Black | 70 | 70 | 70 |
| Acrawax C[1] | 2 | 2 | 2 |
| Sodium Stearate | 3.5 | 3.5 | 3.5 |
| Sulfur | - | 0.2 | 0.2 |
| Amine-blocked isocyanate[2] | 1.0 | - | - |

1 - synthetic wax
2 - m,p-dichlorophenyl isocyanate blocked with dimethylamine

| | 1 | 2 | 3 |
|---|---|---|---|
| Press Cure Conditions | | | |
| Time, minutes | 8 | 8 | 8 |
| Temperature, °F. | 350 | 350 | 350 |
| Tensile, psig | 1520 | 800 | 750 |
| Elongation, percent | 210 | 430 | 360 |
| Compression set, percent - 70 hrs. at 300°F. | 73 | 95 | 94 |
| Tempered Data | | | |
| Hours at 350°F. | 8 | 8 | 8 |
| Tensile, psig | 1750 | 1810 | 1650 |
| Elongation, percent | 135 | 180 | 200 |
| Compression set, percent - 70 hrs. at 300°F. | 30 | 44 | 41 |

The halogen- and carboxyl-containing rubber, sample 1, readily cured using the alkali metal carboxylate and amine-blocked isocyanate cure system. Samples 2 and 3, vulcanized using a known soap/sulfur system, cured slower as evidenced by the lower tensile on press-cure and much higher compression set of the samples. This example demonstrates that the novel vulcanizable compositions obtain a given state of cure much faster than previously known or suggested compositions.

EXAMPLE III

A rubber containing 97.8 percent by weight of ethyl acrylate, 1.6 percent by weight of 5-chloroacetoxymethyl-2-norbornene, and 0.6 percent by weight of methacrylic acid was cured using potassium stearate catalyzed using a guanidine. The recipe and data were as follows:

| | |
|---|---|
| Rubber | 100 |
| Acrawax C | 2 |
| N550 Black | 65 |
| Potassium Stearate | 2.8 |
| Guanidine/isocyanate[1] | 0.7 |

1 - di(tetramethyl guanidine)/toluene diisocyanate reaction product

| | |
|---|---|
| Press-cure, 20' at 350°F. | |
| Tensile, psig | 1780 |
| Elongation, percent | 140 |
| Hardness, Durometer A | 68 |
| Compression set, percent - 70 hrs. | 35 | at 300°F.

Post-Cure, 8 hrs. at 350°F.
Compression set, percent - 70 hrs. at 300°F.   19

The example demonstrates the use in the cure system of guanidine catalysts employed as guanidine-isocyanate reaction products.

EXAMPLE IV

Acrylate rubbers having both halogen and carboxyl cure sites were vulcanized using potassium or sodium stearate or disodium azelate as the curative and amine-blocked isocyanates as cure catalysts. The rubber composition used was as follows (in weight percent):

| | |
|---|---|
| Ethyl Acrylate | 23.4 |
| n-butyl Acrylate | 75 |
| Methacrylic Acid | 0.3 |
| Vinyl Benzyl Chloride | 1.3 |

The example demonstrates the utility of the amine-blocked isocyanate as catalysts. The amine-blocked isocyanates must first break down to free the amine for catalysis. Hence, these catalysts are slower acting than the use of free amines.

| | 1 | 2 | 3 | 4 | 5 | 6 | 7 | 8 | 9 | 10 |
|---|---|---|---|---|---|---|---|---|---|---|
| Rubber | 100 | 100 | 100 | 100 | 100 | 100 | 100 | 100 | 100 | 100 |
| Acrawax C | 2 | 2 | 2 | 2 | 2 | 2 | 2 | 2 | 2 | 2 |
| TE-80[1] | 2 | 2 | 2 | 2 | 2 | 2 | 2 | 2 | 2 | 2 |
| N550 Black | 80 | 80 | 80 | 80 | 80 | 80 | 80 | 80 | 80 | 80 |
| Sodium Stearate | 3.0 | 3.5 | 3.5 | 4.0 | 3.5 | — | 3.5 | 4.5 | 3.5 | — |
| Potassium Stearate | — | — | — | — | — | — | — | — | — | 3.5 |
| Disodium Azelate | — | — | — | — | — | 1.2 | — | — | — | — |
| Dimethylamine/toluene diisocyanate | 0.7 | 1.0 | — | — | — | — | — | — | — | — |
| Dimethylamine/p-chlorophenyl isocyanate | — | — | 1.0 | 1.0 | — | 1.0 | 1.0 | 1.0 | 0.7 | 1.0 |
| Dimethylamine/m,p-dichlorophenyl isocyanate | — | — | — | — | 1.0 | — | — | — | — | — |
| Dodecyl bromide | — | — | — | — | — | — | 1.0 | 1.0 | 1.0 | — |
| Press Cure (60 minutes at 320°F.) | | | | | | | | | | |
| Tensile, psi | 1040 | 1050 | 1080 | 1010 | 1100 | 1000 | 1100 | 930 | 1150 | 1150 |
| Elongation, percent | 140 | 180 | 180 | 170 | 160 | 140 | 130 | 160 | 140 | 170 |
| Hardness, Durometer A | 75 | 75 | 77 | 75 | 75 | 81 | 78 | 78 | 76 | 75 |
| Compression Set, percent (70 hrs. at 300°F.) | | | | | | | | | | |
| Press-Cure | 61 | 63 | 56 | 56 | 47 | 80 | 72 | 63 | 66 | 45 |
| Post-Cure[2] | 40 | 55 | 30 | 42 | 26 | 53 | 40 | 39 | 36 | 26 |

1 - synthetic wax
2 - 20 hours at 300°F.

EXAMPLE V

An acrylate rubber consisting of interpolymerized units of 75.5% by weight n-butyl acrylate, 23% ethyl acrylate, 0.3% methacrylic acid, and 1.2% by weight vinyl benzyl chloride was cured using varying amounts of sodium stearate as the curative and dimethylamine-blocked p-chlorophenyl isocyanate as the cure catalyst. Recipes, cure conditions, and results are given in the following table.

| | 1 | 2 | 3 | 4 | 5 | 6 |
|---|---|---|---|---|---|---|
| Rubber | 100 | 100 | 100 | 100 | 100 | 100 |
| Acrawax C | 2 | 2 | 2 | 2 | 2 | 2 |
| N550 Black | 55 | 55 | 55 | 55 | 55 | 55 |
| N881 Black | 20 | 20 | 20 | 20 | 20 | 20 |
| Sodium Stearate | 2.3 | 2.3 | 2.3 | 2.0 | 2.5 | 2.5 |
| Dimethylamine/p-chlorophenyl isocyanate | 0.6 | 0.8 | 1.0 | 1.0 | 0.6 | 1.0 |
| Press-Cure (40 minutes at 310°F.) | | | | | | |
| Tensile, psi | 1400 | 1400 | 1370 | 1370 | 1330 | 1150 |
| Elongation, percent | 250 | 240 | 240 | 240 | 230 | 230 |
| Hardness, Durometer A | 58 | 60 | 60 | 61 | 60 | 53 |
| Compression Set, percent (70 hrs. at 300°F.) | 64 | 64 | 53 | 59 | 65 | 64 |
| Post-Cure (20 hours at 300°F.) | | | | | | |
| Tensile, psi | 1300 | 1370 | 1300 | 1330 | 1310 | 1050 |

-continued

| | 1 | 2 | 3 | 4 | 5 | 6 |
|---|---|---|---|---|---|---|
| Elongation, percent | 150 | 140 | 180 | 150 | 150 | 160 |
| Hardness, Durometer A | 67 | 66 | 65 | 67 | 68 | 60 |
| Compression Set (70 hrs. at 300°F.) | 30 | 31 | 27 | 34 | 26 | 40 |

EXAMPLE VI

An acrylate rubber consisting of interpolymerized units of 47% by weight of ethyl acrylate, 46.5% by weight of n-butyl acrylate, 5% by weight of ethyl vinyl ether, 0.3% by weight of methacrylic acid, and 1.2% by weight of vinyl benzyl chloride was cured. The recipe used was: 100 parts by weight acrylate rubber, 2 parts Acrawax C, 55 parts N550 black, 20 parts N881 black, 2.0 parts sodium stearate, 1.0 part dimethylamine/m,p-dichlorophenyl isocyanate, and 1.0 part dodecyl bromide. The press-cure properties obtained were 700 psi tensile, 70 percent elongation, and 75 Durometer A hardness (cured 30 minutes at 320°F.).

We claim:
1. A composition comprising (1) an acrylate rubber comprising (a) from about 40 percent to about 99.8 percent by weight of an acrylate or mixtures of acrylates of the formula

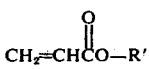

wherein R' is selected from the group consisting of an alkyl radical containing 1 to 18 carbon atoms, an alkoxyalkyl radical, alkylthioalkyl radical, and cyanoalkyl radical each containing a total of 2 to about 12 carbon atoms in the radical, (b) from about 0.1 percent to about 30 percent by weight of a halogen-containing monomer selected from the group consisting of halogen-containing vinylidene hydrocarbons and halogen-containing vinyl monomers wherein the halogen group is at least 2 carbon atoms removed from an oxygen atom, (c) from about 0.1 percent to about 20 percent by weight of a carboxyl-containing monomer, and (d) up to about 35 percent by weight of a non-halogen-containing and non-carboxyl-containing copolymerizable monomer having a terminal vinylidene group, and (2) a cure system consisting essentially of (a) from about 0.5 part to about 7 parts by weight based upon 100 parts by weight of the rubber of an alkali metal salt of an acid selected from the group consisting of carboxylic acids containing 2 to about 24 carbon atoms and organophosphoric acids of the structure

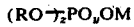

wherein M is an alkali metal, y = 1 or 2, z = 1 or 2, and y + z = 3, and R is selected from the group consisting of an alkyl radical containing 1 to 24 carbon atoms, an aryl radical containing 6 to 24 carbon atoms, and an alkylphenoxy poly(ethyleneoxy)ethyl radical, and (b) from about 0.1 part to about 10 parts by weight based upon 100 parts by weight of the rubber of an amine-blocked isocyanate wherein the amine has a dissociation constant of below 10 and is a secondary amine or guanidine.

2. A composition of claim 1 wherein the acrylate rubber consists essentially of interpolymerized units of (a) an acrylate or mixtures of acrylates wherein R' is an alkyl radical containing 1 to about 10 carbon atoms or an alkoxy alkyl radical containing 2 to about 8 carbon atoms, (b) a halogen-containing monomer(s) selected from the group consisting of vinyl benzyl chloride, vinyl benzyl bromide, 5-chloromethyl-2-norbornene, 5-bromomethyl-2-norbornene, 5-β-chloroethyl-2-norbornene, vinyl chloroacetate, vinyl bromoacetate, allyl chloroacetate, vinyl-3-chloropropionate, vinyl-4-chlorobutyrate, vinyl-4-bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, 2-chloroethyl vinyl ether, chloromethyl vinyl ketone, 2-chloroethyl vinyl ketone, 5-chloroacetoxymethyl-2-norbornene, and 5-(α,β-dichloropropionylmethyl)-2-norbornene, (c) a carboxyl-containing monomer(s) selected from the group consisting of acrylic acid, methacrylic acid, ethacrylic acid, β,β-dimethyl acrylic acid, crotonic acid, 2-pentenoic acid, 2-hexenoic acid, maleic acid, fumaric acid, citraconic acid, mesaconic acid, itaconic acid, and 3-butene-1,2,3-tricarboxylic acid, and (d) a copolymerizable monomer selected from the group consisting of vinyl acetate, allyl acetate, methyl and ethyl methacrylate, vinyl ethyl ether, styrene, α-methyl styrene, acrylonitrile, methacrylonitrile, acrylamide, methacrylamide, divinyl benzene, and diethylene glycol diacrylate.

3. A composition of claim 2 wherein (2) (a) is an alkali metal salt of a monocarboxylic acid containing from about 6 to about 20 carbon atoms, said acid salt being used in a level from about 1 part to about 5 parts by weight per 100 parts by weight of acrylate rubber.

4. A composition of claim 3 wherein (2) (b) is an amine-blocked isocyanate wherein the amine is a secondary amine or a guanidine and the isocyanate is an aromatic isocyanate, said amine-blocked isocyanate used in from about 0.3 part to about 5 parts by weight per 100 parts by weight of the acrylate rubber.

5. A composition of claim 4 wherein (1) is an acrylate rubber of (a) ethyl acrylate, n-butyl acrylate, or mixtures thereof, (b) vinyl benzyl chloride or 5-chloroacetoxymethyl-2-norbornene, and (c) methacrylic acid.

6. A composition of claim 5 wherein (2) (a) is an alkali metal salt of stearic acid and (2) (b) is a dialkyl amine-blocked isocyanate wherein the alkyl radicals contain 1 to about 6 carbon atoms and the isocyanate is a phenyl isocyanate or an aromatic diisocyanate.

7. A composition of claim 6 comprising (1) an acrylate rubber of ethyl acrylate, vinyl benzyl chloride, and methacrylic acid, and (2) a cure system consisting essentially of (a) sodium stearate and (b) a dimethylamine-blocked m,p-dichlorophenyl isocyanate.

8. A composition of claim 6 comprising (1) an acrylate rubber of ethyl acrylate, n-butyl acrylate, vinyl benzyl chloride, and methacrylic acid and (2) a cure system consisting essentially of (a) sodium or potassium stearate and (b) a dimethylamine-blocked isocyanate wherein the isocyanate is p-chlorophenyl isocyanate, m,p-dichlorophenyl isocyanate, or toluene diisocyanate.

9. A composition of claim 8 wherein (2) (a) is sodium stearate and (2) (b) is dimethylamine-blocked p-chlorophenyl isocyanate.

10. A composition of claim 5 comprising (1) an acrylate rubber of ethyl acrylate, 5-chloroacetoxymethyl-2-norbornene, and methacrylic acid and (2) a cure system consisting essentially of (a) potassium stearate and (b) tetramethyl guanidine-blocked toluene diisocyanate.

* * * * *